United States Patent
Budilovsky et al.

(10) Patent No.: US 12,022,027 B1
(45) Date of Patent: Jun. 25, 2024

(54) SYSTEMS AND METHODS RELATING TO A CONTACT CENTER MEDIA SERVICES

(71) Applicant: GENESYS CLOUD SERVICES, INC., Menlo Park, CA (US)

(72) Inventors: Grygoriy Budilovsky, Menlo Park, CA (US); Mikhail G. Epiktetov, Menlo Park, CA (US)

( * ) Notice: Subject to any disclaimer, the term of this patent is extended or adjusted under 35 U.S.C. 154(b) by 0 days.

(21) Appl. No.: 18/121,213

(22) Filed: Mar. 14, 2023

Related U.S. Application Data

(60) Provisional application No. 63/433,545, filed on Dec. 19, 2022.

(51) Int. Cl.
*H04M 3/51* (2006.01)
*G06Q 30/016* (2023.01)

(52) U.S. Cl.
CPC ........ *H04M 3/5175* (2013.01); *G06Q 30/016* (2013.01); *H04M 3/5191* (2013.01)

(58) Field of Classification Search
CPC . H04M 3/5175; H04M 3/5191; G06Q 30/016
USPC ............ 379/265.03, 265.02, 265.05, 265.06, 379/265.11, 266.01, 265.01, 265.1, 242
See application file for complete search history.

(56) References Cited

U.S. PATENT DOCUMENTS

2016/0294621 A1* 10/2016 Werth ................ H04M 3/5191

* cited by examiner

*Primary Examiner* — Thjuan K Addy

(57) ABSTRACT

A method of providing customer relations services to customer on behalf of a contact center by utilizing agent devices, the agent devices being updated over a network with content items and the content items being processed by the agent devices so to provide the customer relation services. The method includes: receiving a request for a first content item from a first agent device of the agent devices; identifying candidate agent devices from the agent devices as ones of the agent devices capable of providing the first content item; selecting, via selection rules included in control logic, a selected agent device from the candidate agent devices for sharing the first content item with the first agent device; and transmitting instructions to the selected agent device initiating the selected agent device to transfer the first content item with the first agent device.

20 Claims, 5 Drawing Sheets

SYSTEMS AND METHODS RELATING TO A CONTACT CENTER MEDIA SERVICES

CROSS-REFERENCE TO RELATED APPLICATIONS

This application claims priority to and the benefit of U.S. Provisional Application No. 63/433,545, titled "SYSTEMS AND METHODS RELATING TO A DISTRIBUTED MEDIA SYSTEM FOR A CONTACT CENTER", filed on Dec. 19, 2022, the contents of which are incorporated herein by reference to their entirety.

BACKGROUND

The present invention generally relates to the field of contact centers and customer relations management. More particularly, but not by way of limitation, the present invention pertains to assisting customers via internet-based service options, including ways to automate the customer experience and provide media content related thereto via a distributed media system.

BRIEF DESCRIPTION OF THE INVENTION

The present invention includes a method of providing customer relations services to customers on behalf of a contact center by utilizing agent devices over a network. Each of the agent devices may be configured for use by an agent to provide the customer relation services. The content items being shared may include digital media configured for use by a receiving one of the agent devices to deliver the customer relation services to a given one of the customers. The method may include the step of maintaining a central authority system of the contact center. The central authority system may include: control logic for orchestrating a manner in which the content items are shared between the agent devices so to provide the customer relation services; a media content library on which is stored the content items for downloading to the agent devices; an agent device database on which is stored data describing a current status of the agent devices, the current status including for each of the agent devices: a current availability; a current performance characteristic; and a listing of the content items currently stored thereon. The method may include the step of registering the agent devices with a central authority system of the contact center, wherein the registering includes providing a download to each of the agent devices of a local software application for operation thereon, the local software application performing the following steps to complete the registering of the agent device: performing a diagnostic check related to the agent device to determine general performance characteristics related to the agent device; configuring a secure communication channel with the central authority system so to enable the agent device to receive instructions from the central authority system and provide updates as to the current status to the central authority system; and downloading one or more of the content items for storage on the agent device. The method may include the step of receiving, by the central authority system from the local software applications operating on the agent devices, periodic updates as to the current status of each of the agent devices and updating the agent device database in accordance with the received updates. The method may further include the steps of: receiving, at the central authority system, a request for a first content item of the content items from a first agent device of the agent devices; identifying, via the central authority system referencing the updated agent device database, candidate agent devices from the agent devices as ones of the agent devices capable of providing the first content item to the first agent device; selecting, by the central authority system via selection rules included in the control logic, a selected agent device from the candidate agent devices for sharing the first content item with the first agent device; and transmitting, by the central authority system, instructions to the selected agent device initiating the selected agent device to transfer the first content item with the first agent device via a transmission over the network.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention will become more readily apparent as the invention becomes better understood by reference to the following detailed description when considered in conjunction with the accompanying drawings, in which like reference symbols indicate like components. The drawings include the following figures.

DETAILED DESCRIPTION

Figure 1:
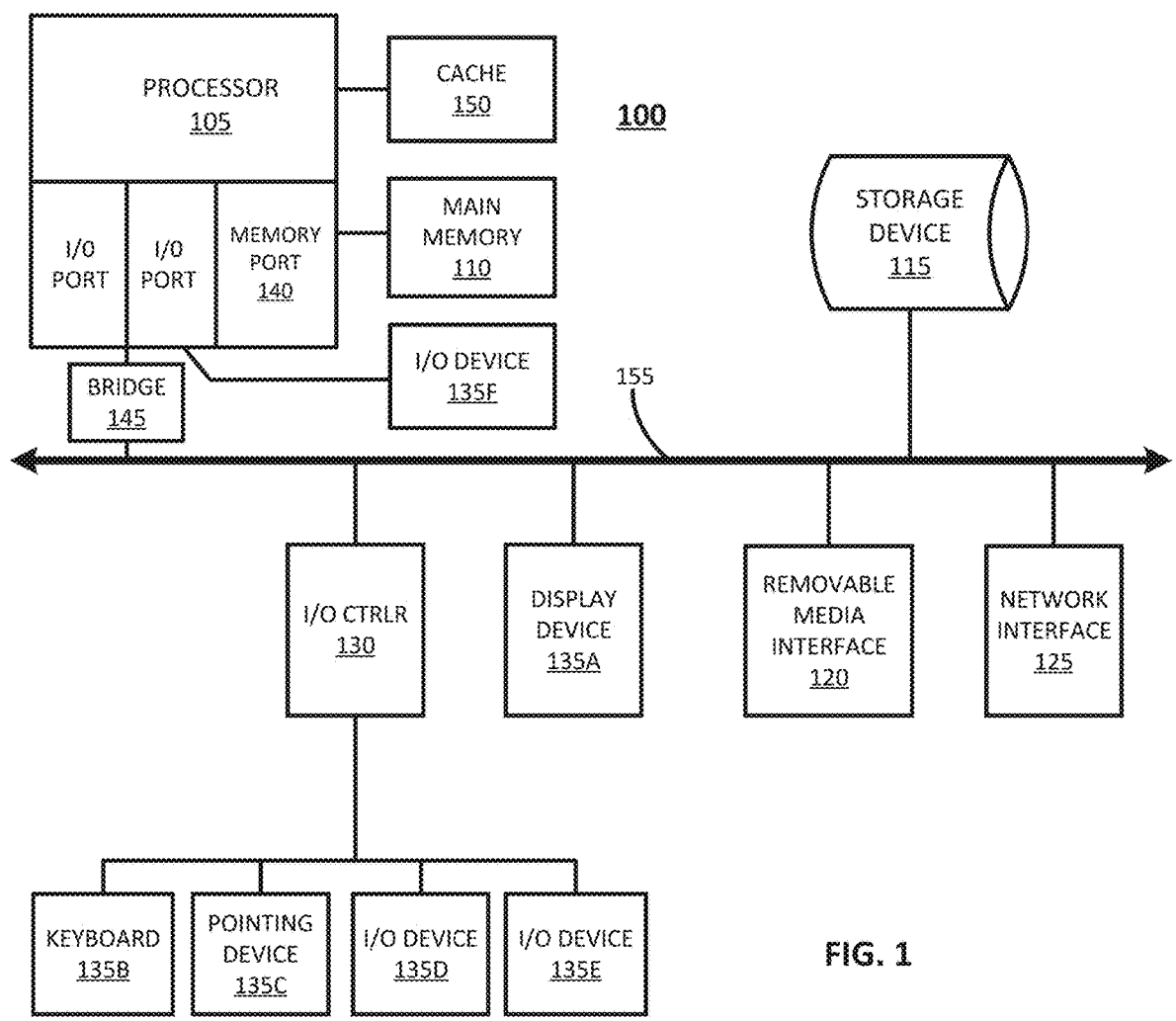
FIG. 1 depicts a schematic block diagram of a computing device in accordance with exemplary embodiments of the present invention and/or with which exemplary embodiments of the present invention may be enabled or practiced.

For the purposes of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. As used herein, language designating nonlimiting examples and illustrations includes "e.g.", "i.e.", "for example", "for instance" and the like. Further, reference throughout this specification to "an embodiment", "one embodiment", "present embodiments", "exemplary embodiments", "certain embodiments" and the like means that a particular feature, structure, or characteristic described in connection with the given example may be included in at least one embodiment of the present invention. Particular features, structures or characteristics may be combined in any suitable combinations and/or sub-combinations in one or more embodiments or examples. Those skilled in the art will recognize from the present disclosure that the various embodiments may be computer implemented using many different types of data processing equipment, with embodiments being implemented as an apparatus, method, or computer program product.

The flowcharts and block diagrams provided in the figures illustrate architecture, functionality, and operation of possible implementations of systems, methods, and computer program products in accordance with example embodiments of the present invention. In this regard, it will be understood that each block of the flowcharts and/or block diagrams—or combinations of those blocks—may represent a module, segment, or portion of program code having one or more executable instructions for implementing the specified logical functions. It will similarly be understood that each of block of the flowcharts and/or block diagrams—or combinations of those blocks—may be implemented by special purpose hardware-based systems or combinations of special purpose hardware and computer instructions performing the specified acts or functions. Such computer program instructions also may be stored in a computer-readable medium that can direct a computer or other programmable data processing apparatus to function in a particular manner, such that the program instructions in the computer-readable medium produces an article of manufacture that includes instructions by which the functions or acts specified in each block of the flowcharts and/or block diagrams—or combinations of those blocks—are implemented.

Figure 2:
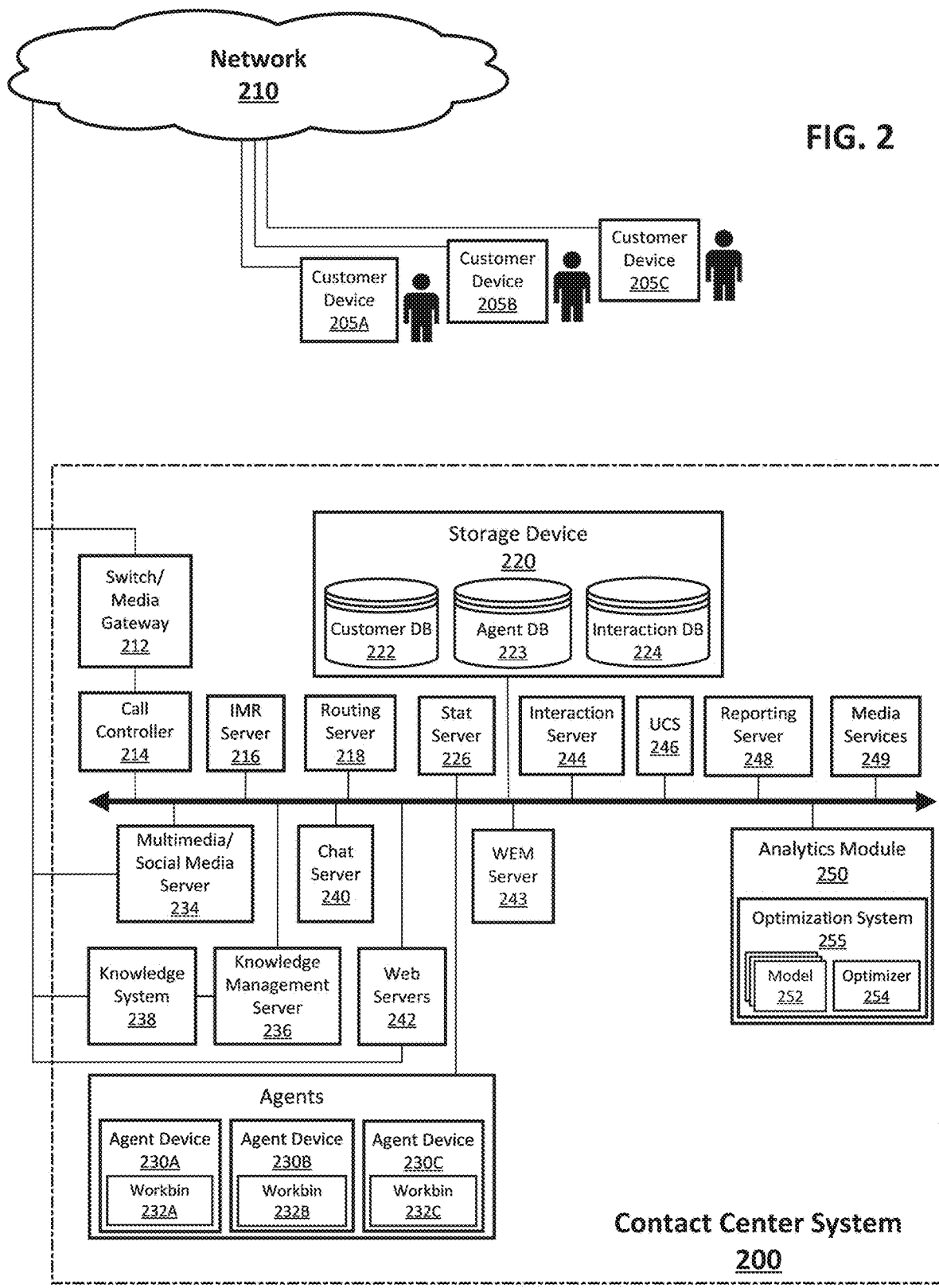
FIG. 2 depicts a schematic block diagram of a communications infrastructure or contact center in accordance with exemplary embodiments of the present invention and/or with which exemplary embodiments of the present invention may be enabled or practiced.

Before proceeding with a detailed description of the present invention, an exemplary computing device and contact center system will be discussed in relation to FIGS. 1 and 2, respectively. As will be understood by one of ordinary skill in the art, the computing device and contact center system are provided as an exemplary environment in which aspects of the present disclosure could be readily implemented, though it should be understood that the methods and systems disclosed herein may not limited to such use unless expressly stated herein. Accordingly, the following description related to FIGS. 1 and 2 is meant to provide general discussion regarding enabling technology as well as background information on contact center systems and the operation thereof. Discussion specifically related to the present invention will continue with reference to FIG. 3, where the manner of its implementation and operation in similar and analogous environments will be provided.

Computing Device

The systems and methods of the present invention may be computer implemented using many different forms of data processing equipment, for example, digital microprocessors and associated memory, executing appropriate software programs. By way of background, FIG. 1 illustrates a schematic block diagram of an exemplary computing device 100 in accordance with embodiments of the present invention and/or with which those embodiments may be enabled or practiced. It should be understood that FIG. 1 is provided as a non-limiting example.

The computing device 100, for example, may be implemented via firmware (e.g., an application-specific integrated circuit), hardware, or a combination of software, firmware, and hardware. It will be appreciated that each of the servers, controllers, switches, gateways, engines, and/or modules in the following figures (which collectively may be referred to as servers or modules) may be implemented via one or more of the computing devices 100. As an example, the various servers may be a process running on one or more processors of one or more computing devices 100, which may be executing computer program instructions and interacting with other systems or modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to any of the computing systems described herein, the various servers and computer devices may be located on computing devices 100 that are local (i.e., on-site) or remote (i.e., off-site or in a cloud computing environment), or some combination thereof.

As shown in the illustrated example, the computing device 100 may include a central processing unit or processor 105 and a main memory 110. The computing device 100 may also include a storage device 115, removable media interface 120, network interface 125, input/output controller 130, and one or more input/output devices 135, which as depicted may include an, display device 135A, keyboard 135B, and pointing device 135C. The computing device 100 further may include additional elements, such as a memory port 140, a bridge 145, input/output ports, one or more additional input/output devices 135D, 135E, 135F, and a cache memory 150 in communication with the processor 105.

The processor 105 may be any logic circuitry that processes instructions fetched from the main memory 110. For example, the process 105 may be implemented by an integrated circuit, e.g., a microprocessor, microcontroller, or graphics processing unit, or in a field-programmable gate array or application-specific integrated circuit. As depicted, the processor 105 may communicate directly with the cache memory 150 via a secondary bus or backside bus. The main memory 110 may be one or more memory chips capable of storing data and allowing stored data to be directly accessed by the central processing unit 105. The storage device 115 may provide storage for an operating system. Unless otherwise limited, the computing device 100 may include an operating system and software capable of performing the functionality described herein.

As depicted in the illustrated example, the computing device 100 may include a wide variety of input/output devices 135, one or more of which may be connected via the input/output controller 130. Input devices, for example, may include a keyboard 135B and a pointing device 135C, e.g., a mouse or optical pen. Output devices, for example, may include video display devices, speakers, and printers. The computing device 100 may also support one or more removable media interfaces 120. More generally, the input/output devices 135 may include any conventional devices for performing the functionality described herein.

Unless otherwise restricted, the computing device 100 may be any workstation, desktop computer, laptop or notebook computer, server machine, virtualized machine, mobile or smart phone, portable telecommunication device, or any other type of computing device, without limitation, capable of performing the functionality described herein. The computing device 100 may include a plurality of devices and resources connected by a network. As used herein, a network includes one or more computing devices, machines, clients, client nodes, client machines, client computers, endpoints, or endpoint nodes in communication with one or more other such devices. The network may be a private or public switched telephone network ("PSTN"), wireless carrier network, local area network, private wide area network, public wide area network, such as the Internet, etc., with connections being established using communication protocols. More generally, it should be understood that, unless otherwise limited, the computing device 100 may communicate with other computing devices 100 via any type of network using any communication protocol. Further, the network may be a virtual network environment where various network components are virtualized.

Contact Center

With reference now to FIG. 2, a communications infrastructure or contact center system 200 is shown in accordance with exemplary embodiments of the present invention and/or with which exemplary embodiments of the present invention may be enabled or practiced. It should be understood that the term "contact center system" may be used herein to refer to the system depicted in FIG. 2 and/or the components thereof, while the term "contact center" may be used more generally to refer to a customer service provider (such as a particular customer service provider providing customer services through the contact center system 200), and/or the organization or enterprise on behalf of which those customer services are being provided.

By way of background, customer service providers generally offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may receive customer orders, solve customer problems with products or services already received, or assist customers in making purchasing decisions. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, or the like.

Referring specifically to FIG. 2, contact centers generally strive to provide quality services to customers while minimizing costs and/or maximizing efficiency. Contact centers may include many different systems and modules—such as those shown in exemplary contact center system 200—in furtherance of this aim. The contact center system 200 may engage and manage interactions in which automated processes (or bots) or human agents communicate with customers. As should be understood, the contact center system 200 may be an in-house facility to a business or enterprise for performing the functions of sales and customer service. In another aspect, the contact center system 200 may be operated by a third-party service provider that contracts to provide services for another organization. Further, the contact center system 200 may be deployed on equipment dedicated to the enterprise or third-party service provider, and/or deployed in a remote computing environment such as, for example, a private or public cloud environment. The contact center system 200 may include software applications executed on premises and/or remotely. The various components of the contact center system 200, thus, may be distributed across various geographic locations and/or housed locally.

Unless otherwise specifically limited, any of the computing elements of the present invention may be implemented in cloud-based or cloud computing environments. As used herein, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS")), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

In accordance with FIG. 2, the components or modules of the contact center system 200 may include: a plurality of customer devices 205A, 205B, 205C; communications network (or simply "network") 210; switch/media gateway 212; call controller 214; interactive media response ("IMR") server 216; routing server 218; storage device 220; statistics (or "stat") server 226; plurality of agent devices 230A, 230B, 230C that include workbins 232A, 232B, 232C, respectively; multimedia/social media server 234; knowledge management server 236 coupled to a knowledge system 238; chat server 240; web servers 242; workforce engagement management ("WEM") server 243; interaction server 244; universal contact server (or "UCS") 246; reporting server 248; media services server 249; and an analytics module 250. Any of the computer-implemented components, modules, or servers described in relation to FIG. 2 or in any of the following figures may be implemented via any type of computing devices, including the example computing device 100 of FIG. 1. As will be seen, the contact center system 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and the like.

Customers desiring to receive services from the contact center system 200 may initiate inbound communications (e.g., telephone calls, emails, chats, etc.) to the contact center system 200 via a customer device 205. While FIG. 2 shows three such customer devices—i.e., customer devices 205A, 205B, and 205C—any number may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center system 200, such as telephone calls, emails, chats, text messages, and the like.

Inbound and outbound communications from and to the customer devices 205 may traverse the network 210, with the nature of network typically depending on the type of customer device being used and form of communication. As an example, the network 210 may include a communication network of telephone, cellular, and/or data services. The network 210 may be a private or public switched telephone network, local area network, private wide area network, and/or public wide area network, such as the Internet. Further, the network 210 may include any wireless carrier network.

In regard to the switch/media gateway 212, it may be coupled to the network 210 for receiving and transmitting telephone calls between customers and the contact center system 200. The switch/media gateway 212 may include a telephone or communication switch configured to function as a central switch for agent level routing within the center. The switch may be a hardware switching system or implemented via software. For example, the switch 215 may include an automatic call distributor, a private branch exchange ("PBX"), an IP-based software switch, and/or any other switch with specialized hardware and software configured to receive Internet-sourced interactions and/or telephone network-sourced interactions from a customer, and route those interactions to, for example, one of the agent devices 230. Thus, in general, the switch/media gateway 212 establishes a voice connection between the customer and the agent by establishing a connection between the customer device 205 and agent device 230. As further shown, the switch/media gateway 212 may be coupled to the call controller 214 which, for example, serves as an adapter or interface between the switch and the other routing, monitoring, and communication-handling components of the contact center system 200. The call controller 214 may be configured to process PSTN calls, VoIP calls, etc. For example, the call controller 214 may include computer-telephone integration software for interfacing with the switch/media gateway and other components. The call controller 214 may include a session initiation protocol ("SIP") server for processing SIP calls. The call controller 214 may also extract data about an incoming interaction, such as the customer's telephone number, IP address, or email address, and then communicate these with other contact center components in processing the interaction.

In regard to the interactive media response ("IMR") server 216, it may be configured to enable self-help or virtual assistant functionality. Specifically, the IMR server 216 may be similar to an interactive voice response ("IVR") server, except that the IMR server 216 is not restricted to voice and may also cover a variety of media channels. In an example illustrating voice, the IMR server 216 may be configured with an IMR script for querying customers on their needs. For example, a contact center for a bank may tell customers via the IMR script to "press 1" if they wish to retrieve their account balance. Through continued interaction with the IMR server 216, customers may receive service without needing to speak with an agent. The IMR server 216 may also be configured to ascertain why a customer is contacting the contact center so that the communication may be routed to the appropriate resource.

In regard to the router or routing server 218, it may function to route incoming interactions. The routing server 218 may perform predictive routing whereby incoming interactions are routed to resources calculated to deliver the best result for the customer and/or contact center. For example, functionality within the routing server 218 may select the most appropriate agent and route the communication thereto. The agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described more below, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent provides to the customer.

Regarding data storage, the contact center system 200 may include one or more mass storage devices—represented generally by the storage device 220—for storing data relevant to the functioning of the contact center. For example, the storage device 220 may store customer data that is maintained in a customer database 222. Such customer data may include customer profiles, contact information, service level agreement, and interaction history (e.g., details of previous interactions with a particular customer, including the nature of previous interactions, disposition data, wait time, handle time, and actions taken by the contact center to resolve customer issues). As another example, the storage device 220 may store agent data in an agent database 223. Agent data maintained by the contact center system 200 may include agent availability and agent profiles, schedules, skills, handle time, etc. As another example, the storage device 220 may store interaction data in an interaction database 224. Interaction data may include data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center system 200 in ways that facilitate the functionality described herein. For example, the servers or modules of the contact center system 200 may query such databases to retrieve data stored therewithin or transmit data thereto for storage. The storage device 220, for example, may take the form of any conventional storage medium and may be locally housed or operated from a remote location.

In regard to the stat server 226, it may be configured to record and aggregate data relating to the performance and operational aspects of the contact center system 200. Such information may be compiled by the stat server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others, as functionality described herein would require.

The agent devices 230 of the contact center 200 may be communication devices configured to interact with the various components and modules of the contact center system 200 in ways that facilitate functionality described herein. An agent device 230 may further include a computing device configured to communicate with the servers of the contact center system 200, perform data processing associated with operations, and interface with customers via voice, chat, email, and other multimedia communication mechanisms according to functionality described herein. While FIG. 2 shows three such agent devices 230, any number may be present.

In regard to the multimedia/social media server 234, it may be configured to facilitate media interactions (other than voice) with the customer devices 205 and/or the web servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

In regard to the knowledge management server 234, it may be configured to facilitate interactions between customers and the knowledge system 238. In general, the knowledge system 238 may be a computer system capable of receiving questions or queries and providing answers in response. The knowledge system 238 may be included as part of the contact center system 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art.

In regard to the chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chatbots, human agents, or both. In exemplary embodiments, the chat server 240 may perform as a chat orchestration server that dispatches chat conversations among the chatbots and available human agents. In such cases, the processing logic of the chat server 240 may be rules driven so to leverage an intelligent workload distribution among available chat resources. The chat server 240 further may implement, manage and facilitate user interfaces (also UIs) associated with the chat feature, including those UIs generated at either the customer device 205 or the agent device 230. The chat server 240 may be configured to transfer chats within a single chat session with a particular customer between automated and human sources such that, for example, a chat session transfers from a chatbot to a human agent or from a human agent to a chatbot. The chat server 240 may also be coupled to the knowledge management server 234 and the knowledge systems 238 for receiving suggestions and answers to queries posed by customers during a chat so that, for example, links to relevant articles can be provided.

In regard to the web servers 242, such servers may be included to provide site hosts for a variety of social interaction sites to which customers subscribe, such as Facebook, Twitter, Instagram, etc. Though depicted as part of the contact center system 200, it should be understood that the web servers 242 may be provided by third parties and/or maintained remotely. The web servers 242 may also provide webpages for the enterprise or organization being supported by the contact center system 200. For example, customers may browse the webpages and receive information about the products and services of a particular enterprise. Within such enterprise webpages, mechanisms may be provided for initiating an interaction with the contact center system 200, for example, via web chat, voice, or email. An example of such a mechanism is a widget, which can be deployed on the webpages or websites hosted on the web servers 242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

In regard to the WEM server 243, it may be configured to host and enable a suite of features focused on improving employee engagement in contact centers, which may be referred to broadly as "workforce engagement management" (or "WEM"). The WEM server 243 may provide solutions that simplify the agent experience and help drive results and employee satisfaction. The WEM server 243 may include capabilities such as call recording, screen recording, quality management, performance management, speech and text analytics, gamification, as well as capabilities related to workforce management (or "WFM") and workforce optimization ("WFO"). In general, WFM makes sure that the right resource is there at the right time for service, while WFO provides the ability to monitor and act upon the content of the interactions via quality management and interaction analytics. In addition to those functions, WEM further ensures that the prerequisites for enabling the contact center to provide effective customer service over the long-term by engaging the agents who provide the service. In doing this, the WEM server 243 may provide functionality aimed at allowing contact centers to improve metrics related to employee recognition, churn, and development. Further, WEM recognizes a shift within the contact center industry from focusing on optimizing labor productivity and managing labor costs—i.e., workforce optimization—to a more employee-centric focus that engages agents throughout the employment life cycle. WEM applications are designed to increase agent engagement by automating tasks associated with scheduling, coaching, quality management, performance management and more. More specifically, the WEM server 243 may include core applications such as recording interactions across all channels, quality monitoring with automated scoring, workforce management with AI-infused scheduling and forecasting, performance management, speech and data analytics, and others. The WEM server 243 may further provide features such as gamification, robotic process automation, voice authentication, predictive analytics, chatbots, customer engagement hub, tools for building custom applications, and AI and analytics. For example, AI-infused algorithms can prepare more accurate agent schedules, customer insights, routing, etc., which consider more variables and have greater predictive power. Further, much of the tedious labor involved in quality monitoring can be automated, which saves time and money and improves agent morale. Other functionality may include any of the related features described herein as would be understood and enabled by one of ordinary skill in the art. Such enablement may include connections with any of the other servers, devices and data sources described herein.

In regard to the interaction server 244, it may be configured to manage deferrable activities of the contact center and the routing thereof to human agents for completion. As used herein, deferrable activities include back-office work that can be performed off-line, e.g., responding to emails, attending training, and other activities that do not entail real-time communication with a customer. As an example, the interaction server 244 may be configured to interact with the routing server 218 for selecting an appropriate agent to handle each of the deferable activities. Once assigned to a particular agent, the deferable activity is pushed to that agent so that it appears on the agent device 230 of the selected agent. The deferable activity may appear in a workbin 232 as a task for the selected agent to complete. The functionality of the workbin 232 may be implemented via any conventional data structure, such as, for example, a linked list, array, etc. Each of the agent devices 230 may include a workbin 232, with the workbins 232A, 232B, and 232C being maintained in the agent devices 230A, 230B, and 230C, respectively. As an example, a workbin 232 may be maintained in the buffer memory of the corresponding agent device 230.

In regard to the universal contact server ("UCS") 246, it may be configured to retrieve information stored in the customer database 222 and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer such as, for example, data related to comments from agents, customer communication history, and the like. Each of these data types then may be stored in the customer database 222 or on other modules and retrieved as functionality described herein requires.

In regard to the reporting server 248, it may be configured to generate reports from data compiled and aggregated by the statistics server 226 or other sources. Such reports may include near real-time reports or historical reports and concern the state of contact center resources and performance characteristics, such as, for example, average wait time, abandonment rate, agent occupancy. The reports may be generated automatically or in response to specific requests from a requestor (e.g., agent, administrator, contact center application, etc.). The reports then may be used toward managing the contact center operations in accordance with functionality described herein.

In regard to the media services server (or "media server") 249, it may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and the like. The media server 249 may store media content locally. In other embodiments, such as those discussed below in relation to FIGS. 4-5, the media server 249 may augment such functionality by orchestrating the remote storage of media files on agent devices and sharing of those media files between agent devices to achieve desired functionality.

In regard to the analytics module 250, it may be configured to provide systems and methods for performing analytics on data received from a plurality of different data sources as functionality described herein may require. In accordance with example embodiments, the analytics module 250 also may generate, update, train, and modify predictors or models 252 based on collected data, such as, for example, customer data, agent data, and interaction data. The models 252 may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module 250 is depicted as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database 222 and agent database 223. The analytics module 250 also may have access to the interaction database 224, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, as discussed more below, the analytic module 250 may be configured to retrieve data stored within the storage device 220 for use in developing and training algorithms and models 252, for example, by applying machine learning techniques.

One or more of the included models 252 may be configured to predict customer or agent behavior and/or aspects related to contact center operation and performance. Further, one or more of the models 252 may be used in natural language processing and, for example, include intent recognition and the like. The models 252 may be developed based upon 1) known first principle equations describing a system, 2) data, resulting in an empirical model, or 3) a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, it may be preferable that the models 252 are nonlinear. This is because nonlinear models can represent curved rather than straight-line relationships between manipulated/disturbance variables and controlled variables, which are common to complex systems such as those discussed herein. Given the foregoing requirements, a machine learning or neural network or deep learning approach is presently a preferred embodiment for implementing the models 252. Such models, for example, may be developed based upon empirical data using advanced regression algorithms.

The analytics module 250 may further include an optimizer 254. As will be appreciated, an optimizer may be used to minimize a "cost function" subject to a set of constraints, where the cost function is a mathematical representation of desired objectives or system operation. Because the models 252 may be non-linear, the optimizer 254 may be a nonlinear programming optimizer. It is contemplated, however, that the present invention may be implemented by using, individually or in combination, a variety of different types of optimization approaches, including, but not limited to, linear programming, quadratic programming, mixed integer non-linear programming, stochastic programming, global non-linear programming, genetic algorithms, particle/swarm techniques, and the like.

According to exemplary embodiments, the models 252 and the optimizer 254 may together be used within an optimization system 255. For example, the analytics module 250 may utilize the optimization system 255 as part of an optimization process by which aspects of contact center performance and operation are optimized or, at least, enhanced. This, for example, may include aspects related to the customer experience, agent experience, interaction routing, natural language processing, intent recognition, or other functionality related to automated processes.

The various components, modules, and/or servers of FIG. 2—as well as those of the other figures included herein—may each include one or more processors executing computer program instructions and interacting with other system components for performing the various functionalities described herein. Such computer program instructions may be stored in a memory implemented using a standard memory device. Although the functionality of each of the servers is described as being provided by the particular server, it should be recognized that the functionality of various servers may be combined or integrated into a single server, or the functionality of a particular server may be distributed across one or more other servers. Further, the terms "interaction" and "communication" are used interchangeably, and generally refer to any real-time and non-real-time interaction that uses any communication channel of the contact center. Access to and control of the components of the contact system 200 may be affected through user interfaces (UIs) that may be generated on the customer devices 205 and/or the agent devices 230.

Figure 3:
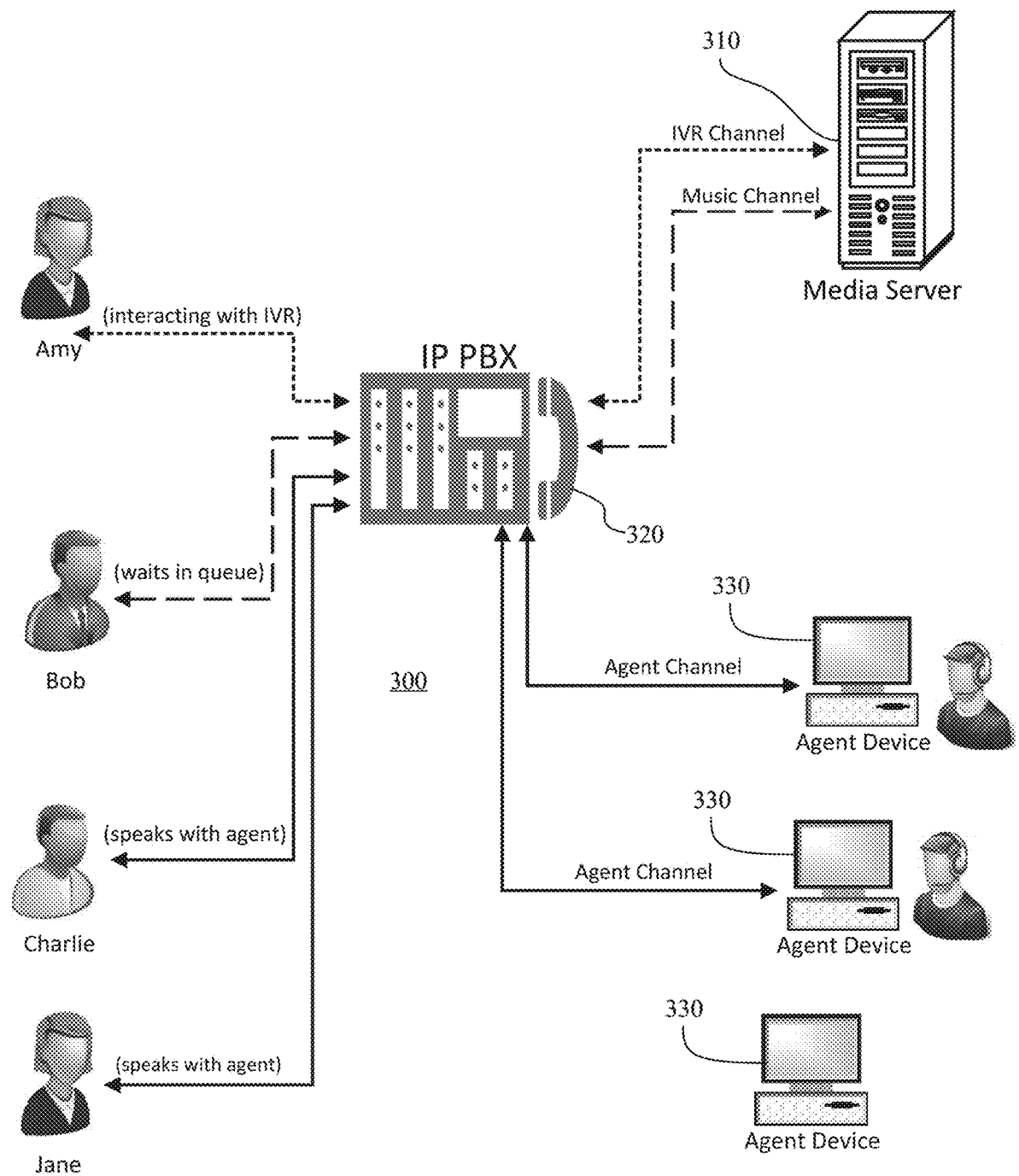
FIG. 3 is schematic diagram showing a conventional centralized system for providing media content to customers of a contact center.
Figure 4:
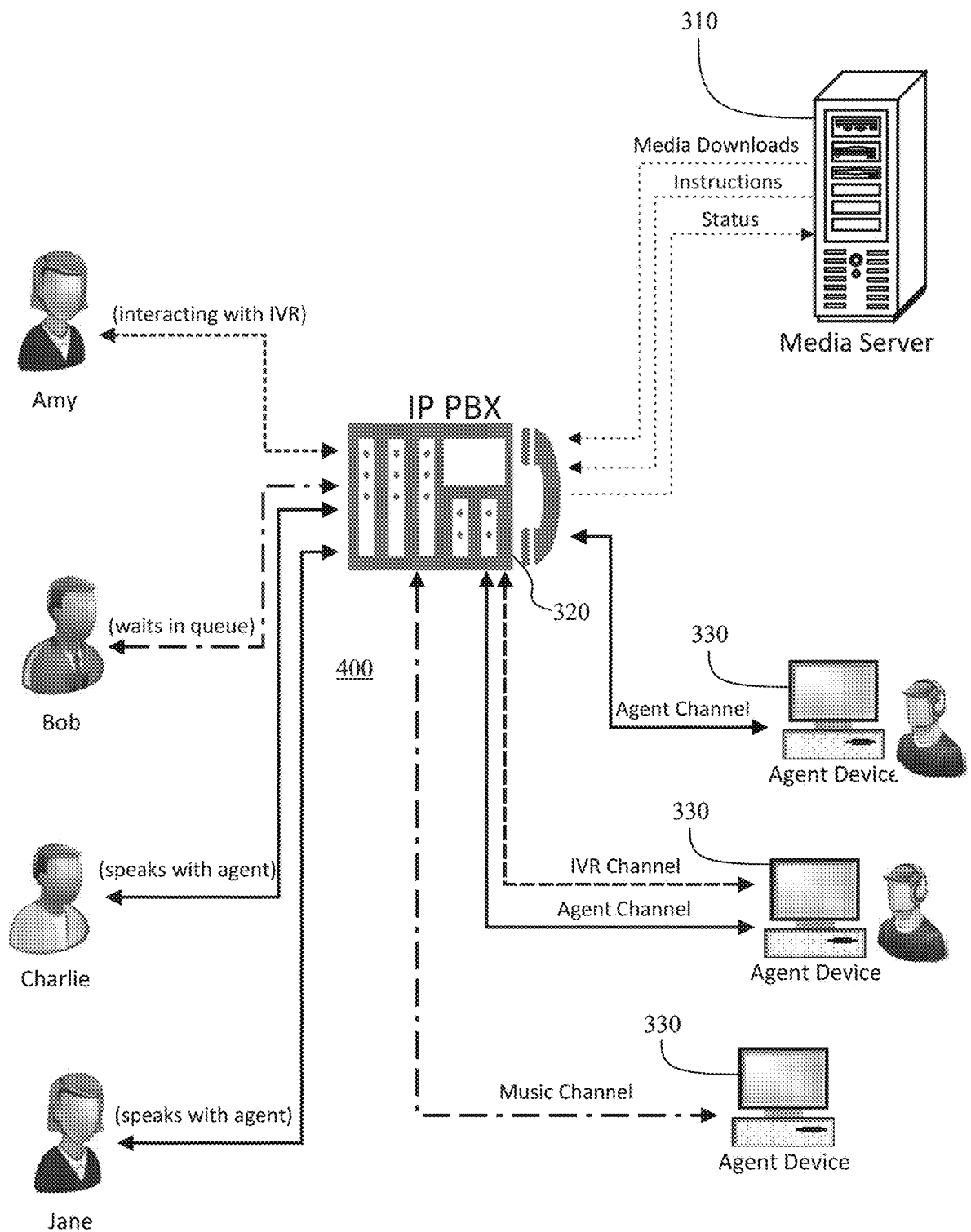
FIG. 4 is a schematic diagram showing a distributed system for providing media content to customers of a contact center in accordance with an exemplary embodiment of the present invention.
Figure 5:
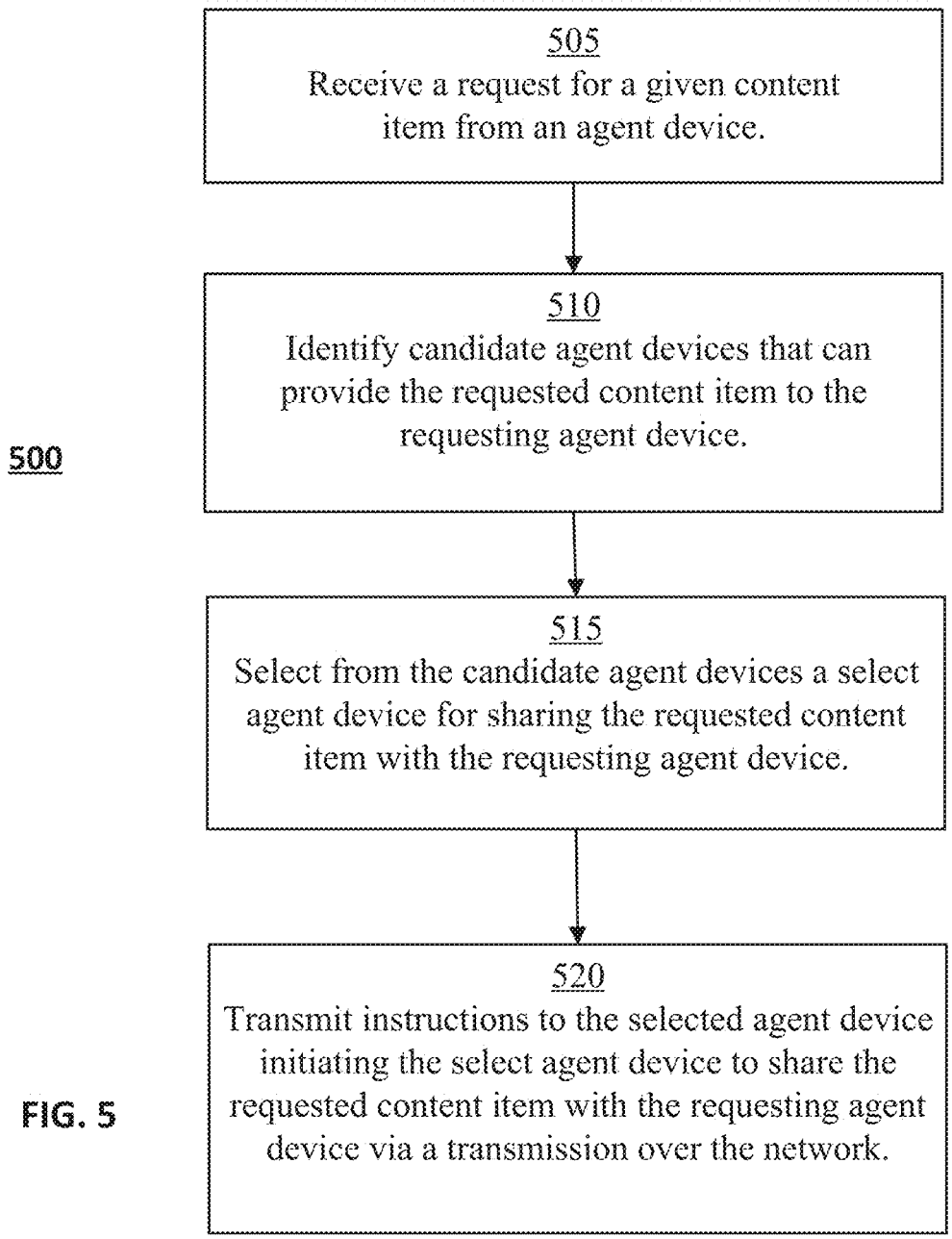
FIG. 5 is a method showing exemplary operation of the distributed media system of FIG. 4 in accordance with an embodiment of the present invention.

Turning now to FIGS. 3-5, the functionality and operation associated with the present invention will now be discussed in accordance with example embodiments. Before proceeding with this, though, some background as to how a contact center functions will be provided while also highlighting some example operational shortcomings of conventional centralized media systems that the present invention is intended to address.

One of the main objectives of a contact center is to connect customers to available human agents. However, as technology advances, another primary function is to connect customers to automated media services and/or play media for customers, for example, customers who are placed on hold and waiting for an agent to become available. In conventional contact centers, this functionality is provided by a dedicated media server farm, which, in modern contact centers, may consist of software server applications controlled by or integrated into an IP PBX or other switch/media gateway. Normally an agent workplace is equipped with a computer desktop, and the agent communicates with customers either using a VoIP desktop application (using a headset plugged into the computer) or with the help of a dedicated IP phone, which itself is a specialized computer.

As will be appreciated, however, such configurations having centralized media services consume significant computer and networking resources and increase the cost of the contact center operations. Further, such costs are realized whether the centralization is achieved in the cloud or on the premise of the contact center. Meanwhile, the computers of the agents are generally underutilized. Further, many agents and their associated devices are no longer housed in a single location, but are dispersed geographically, as more contact center personnel work remotely. As will be seen, embodiments of the present invention propose to take advantage of these circumstances to transfer at least portion of the media services from the centralized media servers to a distributed configuration operating on the computer hardware of the agents. The present invention proposes to provide media streams or content items, including generating media content, conference mixing, dual tone multi-frequency (or "DTMF") collection, etc., by dedicated media microservices running on the computer hardware of the agents, which, hereinafter, may be referenced as agent devices. As will be seen, the media streams and content items provided by this service may include, but are not limited to: audio or video streamed to a customer waiting in a queue for an available agent; content related to automatic IVR services, such as IVR services provided before or after being connected to an agent; content, such as music or video, streamed to a customer while being placed on hold during a call; conference mixing for a call where an agent is a member of the call; as well as other types of media. It should be understood that, unless otherwise limited, it is anticipated that any media content that is provided by a centralized media service or system as part of a conventional contact center may be provided pursuant to the distributed system proposed in the present disclosure. Further, this may be achieved while still maintaining centralized control of how such media content is delivered, for example, via a centralized media server, such as media services server 249 of FIG. 1, that controls how the content is remotely delivered and shared between agent devices.

With reference now to FIG. 3, a conventional media distribution system (or just "media system") 300 is shown. The media system 300 may be associated with a contact center, such as contact center 200 shown in FIG. 2. The media system 300 may include a centralized media server 310 that communicates with an IP PBX 320. The media server 310 may be configured to transmit or stream various media packets to agent devices 330 as necessary for achieving desired functionality in connection with different types of customer interactions and services related thereto. The media server 310 may be housed on the premise of a contact center or in a cloud environment. The IP PBX 320 is an Internet Protocol private branch exchange, which, as will be appreciated, is a system that connects telephone extensions to a public switched telephone network ("PSTN") and provides internal communication, for example, for a business. Additionally, an IP PBX is a PBX system with IP connectivity and may be used to provide audio, video, or instant messaging communication utilizing the TCP/IP protocol stack. Voice over IP ("VoIP") gateways can be combined with traditional PBX functionality to allow businesses or other organizations to use their managed intranet to help reduce phone expenses as well as take advantage of the benefits of a single network for voice and data. As will be appreciated, the IP PBX 320 may exist as a physical hardware device, a software platform, a combination thereof, or other such device fulfilling the described functionality. In alternative embodiments, related functionality may be provided by a switch/media gateway, a call controller, an interactive media response ("IMR") server, and/or a routing server, such as the examples of such components described above in relation to the contact center 200.

The media system 300 may include multiple agent devices 330. In the example shown, three such devices are provided, though, of course, many others would generally be provided in a contact center application. As indicated, two of the agent devices 330 are currently being used by agents to interact with customers. One of the agent devices 330 is shown as being not currently in use. As illustrated, several customers are engaged with several communication channels associated with the contact center via a connection with the media system 300 and, more specifically, the centralized media server 310. One such customer, "Amy", is interacting with IVR. For this interaction, given the functionality that is necessary in a centralized configuration, media content and data associated with IVR functionality is streamed from the media server 310 to the agent device 330. Another such customer, "Bob", waits in a queue for an agent. While waiting, Bob is connected to a music channel, which provides music during his wait. Again, given the necessary functionality associated with a centralized media server 310, the data stream associated with the music channel is provided by the centralized media server 310. The other customers—"Charlie" and "Jane"—are connected with respective agents via agent channels.

With reference now to FIG. 4, a media distribution system (or just "media system") 400 is shown in accordance with embodiments of the present invention. The media system 400 may have a distributed configuration that utilizes agent devices 330 to provide media content items to other agent devices as necessary to achieve desired functionality. In this case, the media streams and content items that are needed to serve the customers may be streamed or transferred to the agent devices 330 from other agent devices 330. Alternatively, a given agent device 330 may further utilize the media content items for one or more interactions being performed by that given agent device, including providing logic or processing resources as necessary.

As will be appreciated, for the distributed media system to function in this manner, initial configuration and set up processes must be completed as well as certain regular maintenance routines. For example, the media server 310 may serve as centralized storage for media files and download such files to agent devices for storage thereon and use thereby. Before such downloads can be completed, each of the agent devices 330 must go through a registration process, which may include registering on the IP PBX 320 or a dedicated registrar. During the registration process, the agent device may provide its own signaling communication network address and port. As also part of this process, the performance capabilities, network connection, and storage capacity of the agent device may be obtained, which may be used to determine the number of interaction channels and/or types of media streams the agent devices capable of handling. After successful registration and a determination is made as to the capabilities of the agent device, media files deemed appropriate for the agent device may be downloaded from the media server 310.

Once this is complete, the agent device may start providing media services to other agent devices. In accordance with exemplary embodiments, the services may be provided at the same time as the agent associated with the device is logged into the contact center system and actively performing contact center work. In accordance with alternative embodiments, the agent device also may be used to distribute media when the agent corresponding with the device is not performing contact center related work and/or when the device is otherwise not being used by the agent. That is, the agent device may stay actively logged into the contact center system and remain active as a media distribution point whether or not the agent associated with the device is concurrently performing contact center work.

In accordance with exemplary embodiments, the contact center monitors the status of each of the agent devices and manages the media distributed from each. For example, the IP PBX may keep count on number of channels occupied by each of the agent devices and utilize those devices in a manner keeping the load across the devices equal or, at least, equal in relation to what each device is capable of handling given its performance capabilities. In accordance with exemplary embodiments, each of the agent devices may periodically transmit status information to the contact center, for example, to the media server. The status information may include the content items maintained on the agent device as well as any changes thereto. The status information may further include any media currently being streamed to other agent devices or any pending assignments as well as any other information relevant to the devices capabilities in handling further streaming services.

In the case where the agent device is a SIP phone, for example, a failure or "out of service" event may be detected by the fact of "SIP REGISTER" timeout expiration or an explicit un-register request. Such an event must be treated by IP PBX as a simultaneous failure of media channels currently active on the agent device. Steps may then be taken to restore the failed media channels. In accordance with exemplary embodiments, special attention may be taken for an agent to shut down their device in a manner that does not affect any streaming services currently being provided by the device. Thus, when an agent brings the agent attempts to shut down the device, the device may first send an un-register request (in the case of SIP protocol it is "REGISTER" with header "Expires: 0"). It is expected that IP PBX will connect customers to other available agent devices, terminate sessions on the current agent device, and, only after this is completed, send the response allowing the device to be taken off-line.

Although reliability of the typical desktop workstation is usually less than that of a dedicated server or cloud service node, the overall fault tolerance of the proposed system may be enhanced given the redundancy of resources available. As will be appreciated, even the most reliable premise or cloud platform can occasionally fail. In the case of a server farm that handles thousands of media channels, failure results in the need to restore all active media sessions. Restoration itself (like bringing up reserve systems, connecting callers to new channels, etc.) will take some time and generally negatively impacts system performance. With the distributed approach proposed in the present disclosure, failures may occur more often, but the failures will be small in scale and the restoration will not impact system performance in any meaningful way. For example, customers served by a single agent device before the fault may simply be allocated on some other agent devices to restore the stream. Further, the distributed approach will result in significant savings by taking advantage of underutilized resources. For example, saving may be conveniently quantified given the hardware or cloud resources that would be required to provide a fully centralized media service.

With specific reference again to FIG. 4, further description of the media system 400 will be provided with reference to the various computing elements and a central authority system, which, as will be seen, provides centralized control and orchestration and other functionality related to the operation of the system and sharing of media. As will be appreciated, the media system 400 includes computing elements associated with the agent devices 330 and the media server 310. The agent devices 330 are configured to fulfil several functions, which may be implemented with the assistance of one or more local software applications. For example, the agent devices 330 provide a peer-to-peer distribution or sharing function of media content items (or simply "content items"). As will be seen, this functionality may be orchestrated and managed via logic stored and executed by the central authority system stored on and implemented by media server 310. The agent devices 330 may be adapted to respond to instructions to provide some or all of a content item for uploading by dividing up content into portions and by transmitting it by an appropriate protocol. The agent devices 330 may also be adapted to respond to incoming content by indicating that it has been safely received and by assembling the received portions to form a content item. This sharing function may be split into separate sending and receiving functions, while mechanisms may also be provided to request a retransmission or an alternative transmission if a content item cannot be or is not successfully provided. The agent devices 330 may communicate with the central authority system of the media server 310 via a network. As will be seen, the agent devices may register with the central authority system and subsequently be authenticated. An audit function may report to the central authority system periodically on content items uploaded and downloaded.

The central authority system hosted on the media server 310 may provide several complementary functions by which centralized management and control of the media system is achieved. Such functions may have no direct counterparts in the agent devices 330. The media server 310 that hosts the central authority system may be located in a contact center. Alternatively, the central authority system may be hosted on a cloud server. In exemplary embodiments, the central authority system provides a control or orchestration function by which media items are shared between the agent devices. To do this, the central authority system may include control logic, for example, in the form of software, specifying how this orchestration proceeds. The control logic may orchestrate the manner in which the content items are shared between the agent devices so to provide desired customer relation services. In exemplary embodiments, the central authority system may include a media content library that stores the content items for downloading to the agent devices. In example embodiments, the central authority system further includes an agent device database that stores data describing a current status for each of the agent devices. The information maintained to indicate the current status for each of the agent devices may include a current availability, current performance characteristic, and the content items currently stored thereon. In example embodiments, the current performance characteristic may include a current bandwidth of a network connection the agent device has with the network. The current performance characteristic may further include a current usage of the agent device that reflects a computing load that the agent device is under, which may be done to ensure that the agent device is capable of timely processing and implementing instructions received from the central authority system.

Before an agent device 330 is allowed to participate in the media system 400, the agent associated with the agent device may be required to execute a registration process, which may include the following steps. First, an agent may apply through their agent device for registration with the media system by a message to the central authority system. The central authority system may then respond by asking for certain credentials from the agent (including proofs of identity or status) which are then provided, for example, through a predesigned form accessible from a web page. The central authority system may then check the credentials provided, interacting with other parties as necessary to obtain necessary confirmation or assurance as to the accuracy and value of the credentials provided. If the central authority system is satisfied that the agent has provided adequate credentials, the agent device is registered as part of the media system. When an agent device joins the media system, the agent device will be equipped with a local software application enabling it to perform the functions of a downloading and uploading agent device on the system. The local software application may be, for example, downloaded from the central authority system upon registration.

In alternative embodiments, registration of an agent device may be initiated by first downloading the local software application to the agent device. Once the local software application is downloaded, the application may perform the following steps to complete the registering of the agent device and prepare it for use by the media system. First, a diagnostic check may be performed related to the agent device to determine general performance characteristics related to the agent device. The general performance characteristics may include: hardware characteristics associated with the agent device, including at least a storage capacity and a processing speed; network connection characteristics including a connection the agent device makes with the network; and a location of the agent device. Second, a secure communication channel may be configured between the agent device and the central authority system so to enable the agent device to receive instructions from the central authority system and provide updates thereto as to current status. Third, to complete the process and prepare the agent device for use by the system, content items are downloaded to the agent device for storage thereon, with the content items then becoming available to be shared with other agent devices.

In accordance with exemplary embodiments, the central authority system may receive periodic updates as to the current status of each of the agent devices. Such updates may be implemented by the local software application operating on each of the agent devices. The central authority system may update the agent device database in accordance with the received updates.

In operation, the central authority system may receive a request for a content item from a particular agent device and search for a preferred one or more other agent devices, which may be referred to as "candidate agent devices", for providing the media item. From the candidate agent devices, the central authority system may select one of the agent devices, which may be referred to as the "selected device", to share the content item with the requesting agent device. The central authority system may then orchestrate the sharing of the content item between the agent devices and verify the success thereof.

More specifically, with reference now to FIG. 5, the central authority system may perform this orchestration function pursuant to a method 500 that includes the following steps. As will be appreciated, the method 500 is a process implemented by the central authority system for managing the sharing of digital media content items between agent devices over a network. Each of the agent devices may be configured for use by an agent associated with a contact center to provide customer relation services to customers. Further, the digital content being shared between the agent devices may be related to providing the customer relation services. At step 505, the method 500 includes the central authority system receiving a request for a given content item from a particular agent device. At step 510, the central authority system may identify candidate agent devices that can provide the requested content item to the requesting agent device. At step 515, the central authority system may select from the candidate agent devices, a selected agent device for sharing the requested content item with the requesting agent device. Finally, at step 520, the central authority system may transmit instructions to the selected agent device initiating the selected agent device to transfer the requested content item with the requesting agent device via a transmission over the network.

As part of the media system 400, the media server 310 may maintain databases that facilitate functionality described herein. For example, the media server 310 may include maintain a media content library (or "content library"). The content library stores the media content that the central authority system downloads to the agent devices for sharing therebetween. The media server 310 may further include an agent device database that identifies the available agent devices associated with the media system and each of the content items they possess and are currently able to upload and in which formats. For example, when the central authority system determines that a content item is needed by one of the agent devices 330, the central authority system determines from the agent device database which one or more candidate agent devices that could participate in sharing the content item and what role each agent device should take. When a content item is not properly received or when an agent device notifies the media server that the content item is not available, the media server may then locate the content item on an alternative agent device. The candidate agent devices may be identified via determining which of the agent devices are capable of fulfilling the request, i.e., those devices that have stored thereon the requested content item and are available to do so (i.e., on-line, functioning, and/or connected to the system and able to receive instructions). Candidate agent devices also could be narrowed by those within a particular geographic region or connected to a particular network. Then the selected agent device may be selected from among the candidate agent devices by comparing the general performance characteristics and the current performance characteristics associated with each of the candidate agent devices. The current performance characteristics, for example, may include a current bandwidth of a network connection the agent device has with the network or a current computing load. As another example, the selection rules may include comparing a distance between each of the candidate agent devices and the requesting agent device; and/or the current bandwidth of the network connection each of the candidate agent devices has with the network.

The central authority system of the media server 310 further may include a performance management function. For example, as part of the periodic updates, the central authority system may receive from the agent devices indications of successful communication of content items and indications of failed transmissions. Information about failed transmissions may be used by the media server 310 when allocating potential upload peers in the future. When the transmission of a content item fails (because of timeout or any other cause) then the agent device may try to download the same portion from another agent device as instructed by the central authority system. The selection rules may include comparing a number of the failed transmissions for each of the candidate agent devices. Thus, in order to improve the efficiency of the process, the system 400 may advantageously identify only a limited set of candidate agent devices known or expected to be capable of providing a sufficient quality of service, for example, because they are able to upload at high bandwidth, because their network location is close to that of the requesting device, and/or because they have a history of not having failed transmissions. Alternatively, the central authority system may identify as candidate agent devices each of the agent devices capable of providing the requested content item.

Accordingly, with reference again to FIG. 4, when the customer "Amy" interacts with IVR, the media content and data associated with IVR functionality may be streamed from one of the agent devices 330, as indicated. Additionally, the music that is provided to customer Bob while he waits in queue for an agent may be streamed from one of the other agent devices 330, as indicated. The other customers Charlie and Jane may be connected with respective agents via agent channels in a manner similar to that shown in FIG. 3.

As will be appreciated, in accordance with exemplary embodiments, a single agent device may produce more than one media stream associated with more than one respective customer interactions. For certain services, such as music while in queue, the agent device used for providing the necessary media stream may be the agent device of an agent who is handling the interaction or is selected to handle the interaction once they become available. However, this is not necessary, as agent devices may be employed for media streaming that are remote to the active agent. In accordance with certain embodiments, some media resources are reserved or prioritized to the agent device of the active handling the interaction. These may include video streamed to a customer, for example, while on hold, or conference mixing.

As will be appreciated, the presently disclosed distributed system configuration offers a series of benefits, these benefits in many cases flowing from synergies between different features of the system. Content items may be provided rapidly and efficiently over a peer-to-peer sharing system with central control that ensures efficient operation and savings over a centralized media system.

Further, in accordance with alternative embodiments, the invention may include a distributed service provision, including a method of providing customer relation services on behalf of a contact center by utilizing agent devices, which are updated with relevant content from central storage over a network. The method may include: receiving a request for a first content item of the content items from a first agent device of the agent devices; identifying candidate agent devices from the agent devices as ones of the agent devices capable of providing the first content item to the first agent device; selecting, via selection rules included in control logic, a selected agent device from the candidate agent devices for sharing the first content item with the first agent device; and transmitting instructions to the selected agent device initiating the selected agent device to transfer the first content item with the first agent device. In addition to servicing content, agent device resources may be used to perform logic actions, like processing IVR input with AI. Thus, while also enabling streaming media, other services may be provided by the agent devices, including functionality described above in FIG. 2 in relation the IMR Server 216 and the Analytics Module 250. That is, it should be understood that the invention not only provides shared media content, but also share agent devices CPU resources, for example, performing the processing of the media stream. In embodiments, content items may not be shared between agent devices, but provided to an agent device from centralized storage used by the agent device to provide services directly from the agent device to the customer. Further, content items and services may be provided by an agent device independent of current agent contact activities. For example, while an agent speaks with a particular customer via an agent device, the same agent device may play music or execute IVR strategy to another customer.

As one of skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the present application as defined by the following claims and the equivalents thereof That which is claimed:

1. A method of providing customer relations services to customer on behalf of a contact center by utilizing agent devices, the agent devices being updated over a network with content items and the content items being processed by the agent devices so to provide the customer relation services, the method comprising the steps of:
   maintaining a central authority system of the contact center, the central authority system comprising:
      control logic for orchestrating a manner in which the content items are shared between the agent devices so to provide the customer relation services;
      a media content library on which is stored the content items for downloading to the agent devices, wherein the content items each comprises digital media used in the delivery of the customer relation services to the customers;
      an agent device database on which is stored data describing a current status of the agent devices, the current status including for each of the agent devices: a current availability; a current performance characteristic; and a listing of the content items currently stored thereon;
   registering the agent devices with a central authority system of the contact center, wherein the registering includes providing a download to each of the agent devices of a local software application for operation thereon, the local software application performing the following steps to complete the registering of the agent device:
      performing a diagnostic check related to the agent device to determine general performance characteristics related to the agent device;
      configuring a secure communication channel with the central authority system so to enable the agent device to receive instructions from the central authority system and provide updates as to the current status to the central authority system; and
      downloading one or more of the content items for storage on the agent device;
   receiving, by the central authority system from the local software applications operating on the agent devices, periodic updates as to the current status of each of the agent devices and updating the agent device database in accordance with the received updates;
   receiving, at the central authority system, a request for a first content item of the content items from a first agent device of the agent devices;
   identifying, via the central authority system referencing the updated agent device database, candidate agent devices from the agent devices as ones of the agent devices capable of providing the first content item to the first agent device;
   selecting, by the central authority system via selection rules included in the control logic, a selected agent device from the candidate agent devices for sharing the first content item with the first agent device; and
   transmitting, by the central authority system, instructions to the selected agent device initiating the selected agent device to transfer the first content item with the first agent device via a transmission over the network.

2. The method of claim 1, wherein the general performance characteristics include:
   hardware characteristics associated with the agent device, including at least a storage capacity and a processing speed;
   network connection characteristics comprising a connection the agent device makes with the network; and
   a location of the agent device.

3. The method of claim 2, wherein the agent devices are dispersed at different locations geographically;
   wherein the candidate agent devices are identified via determining ones of the agent devices that:
      have stored thereon the first content item; and
      are available for receiving instructions and initiating the transfer of the first content item.

4. The method of claim 3, wherein the candidate agent devices are narrowed according to being located in a geographic region defined in relation to a location of the first agent device.

5. The method of claim 3, wherein the current performance characteristic comprises a current bandwidth of a network connection the agent device has with the network.

6. The method of claim 5, wherein the selection rules comprise comparing the general performance characteristics and the current performance characteristics of each of the candidate agent devices.

7. The method of claim 5, wherein the selection rules comprise comparing:
   a distance between a location of each of the candidate agent devices and a location of the first agent device; and
   the current bandwidth of the network connection each of the candidate agent devices has with the network.

8. The method of claim 5, wherein the content item comprises a content item for providing interactive voice response.

9. The method of claim 5, wherein the content item relates to providing at least one of streaming music, streaming video, and analytic service.

10. The method of claim 5, further comprising the step of:
by each of the local software applications, recording data describing each instance in which the associated agent device was instructed to transfer a content item by the central authority system but the transfer of the content item failed; and
receiving, by the central authority system, the data related to the failed transmissions as part of the periodic updates from the agent devices;
wherein the selection rules comprise comparing a number of the failed transmissions for each of the candidate agent devices.

11. The method of claim 5, wherein the selected agent device comprises a one of the agent devices that is currently being used by the corresponding agent to provide the customer relation services to a given one of the customers of the contract center.

12. The method of claim 5, wherein the selected agent device comprises a one of the agent devices that is not currently being used by the corresponding agent to provide the customer relation services to the customers of the contract center.

13. The method of claim 5, wherein the central authority system is hosted on servers located in the contact center.

14. The method of claim 5, wherein the first agent device and the selected agent device comprise a same agent device.

15. A system for providing customer relations services to customer on behalf of a contact center by utilizing agent devices, the agent devices being updated over a network with content items and the content items being processed by the agent devices so to provide the customer relation services, the system comprising:
a processor; and
a memory, wherein the memory stores instructions that, when executed by the processor, cause the processor to perform the steps of:
maintaining a central authority system of the contact center, the central authority system comprising:
control logic for orchestrating a manner in which the content items are shared between the agent devices so to provide the customer relation services;
a media content library on which is stored the content items for downloading to the agent devices, wherein the content items each comprises digital media used in the delivery of the customer relation services to the customers;
an agent device database on which is stored data describing a current status of the agent devices, the current status including for each of the agent devices: a current availability; a current performance characteristic; and a listing of the content items currently stored thereon;
registering the agent devices with a central authority system of the contact center, wherein the registering includes providing a download to each of the agent devices of a local software application for operation thereon, the local software application performing the following steps to complete the registering of the agent device:
performing a diagnostic check related to the agent device to determine general performance characteristics related to the agent device;
configuring a secure communication channel with the central authority system so to enable the agent device to receive instructions from the central authority system and provide updates as to the current status to the central authority system; and
downloading one or more of the content items for storage on the agent device;
receiving, by the central authority system from the local software applications operating on the agent devices, periodic updates as to the current status of each of the agent devices and updating the agent device database in accordance with the received updates;
receiving, at the central authority system, a request for a first content item of the content items from a first agent device of the agent devices;
identifying, via the central authority system referencing the updated agent device database, candidate agent devices from the agent devices as ones of the agent devices capable of providing the first content item to the first agent device;
selecting, by the central authority system via selection rules included in the control logic, a selected agent device from the candidate agent devices for sharing the first content item with the first agent device; and
transmitting, by the central authority system, instructions to the selected agent device initiating the selected agent device to transfer the first content item with the first agent device via a transmission over the network.

16. The system of claim 15, wherein the general performance characteristics include:
hardware characteristics associated with the agent device, including at least a storage capacity and a processing speed;
network connection characteristics comprising a connection the agent device makes with the network; and
a location of the agent device.

17. The system of claim 16, wherein the agent devices are dispersed at different locations geographically;
wherein the candidate agent devices are identified via determining ones of the agent devices that:
have stored thereon the first content item; and
are available for receiving instructions and initiating the transfer of the first content item;
wherein the current performance characteristic comprises a current bandwidth of a network connection the agent device has with the network.

18. The system of claim 17, wherein the selection rules comprise comparing the general performance characteristics and the current performance characteristics of each of the candidate agent devices; and
wherein the content item relates to providing at least one of streaming music and streaming video.

19. The system of claim 17, wherein the selection rules comprise comparing:
a distance between a location of each of the candidate agent devices and a location of the first agent device; and
the current bandwidth of the network connection each of the candidate agent devices has with the network.

20. The system of claim 17, wherein the content item comprises a content item for providing interactive voice response.

* * * * *